United States Patent [19]

Simpson et al.

[11] Patent Number: 5,161,275
[45] Date of Patent: Nov. 10, 1992

[54] VEHICLE SEAT LINER TO FACILITATE EXTRACTION OF AN INJURED DRIVER

[75] Inventors: Russell W. Simpson; Dwight E. Hoelscher, both of Denver, Colo.

[73] Assignee: Safety Quest, Inc., Denver, Colo.

[21] Appl. No.: 855,193

[22] Filed: Mar. 20, 1992

[51] Int. Cl.$^5$ .................. A61G 1/017; A61G 1/013
[52] U.S. Cl. .......................... 5/627; 5/625; 297/250; 297/485
[58] Field of Search .............. 5/627, 625, 626, 628, 5/424, 653, 657; 297/485, 250

[56] References Cited

U.S. PATENT DOCUMENTS

| | | | |
|---|---|---|---|
| 1,849,864 | 3/1932 | Caspar | 5/627 |
| 2,350,573 | 6/1944 | Smith, Jr. et al. | 5/627 |
| 2,555,566 | 3/1947 | Bleck . | |
| 2,557,874 | 11/1946 | Kailenta . | |
| 2,675,060 | 3/1953 | Strand . | |
| 2,835,902 | 5/1958 | Fash | 5/627 |
| 3,014,761 | 12/1961 | Otto | 297/230 |
| 3,271,796 | 9/1966 | Dillman | 5/625 |
| 3,648,305 | 3/1972 | Ersek | 5/625 |
| 4,113,307 | 9/1978 | Day | 297/232 |
| 4,601,075 | 7/1986 | Smith | 5/628 |
| 4,759,588 | 7/1988 | Husnik | 297/468 |
| 4,945,582 | 8/1990 | Hayton et al. . | |

FOREIGN PATENT DOCUMENTS 1472272 5/1977 United Kingdom .................. 5/625

Primary Examiner—Alexander Grosz
Attorney, Agent, or Firm—Dorr, Carson, Sloan & Peterson

[57] ABSTRACT

A vehicle seat liner is used to allow manual extrication of an injured driver from the vehicle seat. The liner is formed of two rigid board elements disposed against those portions of said vehicle seat normally contacted by the back and buttocks of the operator when seated. The board elements are pivotally joined to each other adjacent the juncture of the aforesaid portions of the vehicle seat. This permits the driver to sit on the liner when in the seated position in the vehicle seat and to lie upon the liner when the board elements are pivoted relative to each other to form a substantially planar configuration. The liner also has handles, hand grips, straps, or the like, that can be grasped by rescue personnel reaching into the interior of the vehicle to extricate the driver. This permits rescuers to lift the liner and the driver from the vehicle seat and out of the vehicle while stabilizing of the head and spinal cord of the driver.

9 Claims, 8 Drawing Sheets

VEHICLE SEAT LINER TO FACILITATE EXTRACTION OF AN INJURED DRIVER

BACKGROUND OF THE INVENTION

1. Field of the Invention

The present invention relates generally to the field of driver safety devices. More specifically, the present invention discloses a vehicle seat liner to facilitate extraction of an injured driver from the vehicle while stabilizing the driver's head and spinal cord.

2. Statement of the Problem

Accident and resulting injuries are an all too common occurrence for race car drivers. Given the high speeds involved in car racing, many accidents result in which the driver is too badly injured or traumatized to extricate himself from the vehicle following the crash. Of course, time is of the essence after an accident to commence medical treatment of the injured driver and also to quickly remove the driver from the vicinity of the vehicle in case of fire or explosion. These accidents sometimes involve injuries to the head or spinal cord of the driver. In such situations, it is imperative to stabilize the driver's head and spinal cord as the driver is removed from the vehicle to prevent or minimize the risk of paralysis or further permanent injury to the driver.

The prior art contains several examples of infant seats, stretchers, litters, and seat inserts used for a wide variety of purposes, including the following:

| Inventor | U.S. Pat. No. | Issue Date |
|---|---|---|
| Kailenta | 2,557,874 | June 19, 1951 |
| Bleck | 2,555,566 | June 5, 1951 |
| Strand | 2,675,060 | Apr. 13, 1954 |
| Otto | 3,014,761 | Dec. 26, 1961 |
| Day | 4,113,307 | Sep. 12, 1978 |
| Husnik | 4,759,588 | July 26, 1988 |
| Hayton, et. al. | 4,945,582 | Aug. 7, 1990 |

Bleck discloses a collapsible infant seat with a rigid back-supporting board having a slot adapted to be grasped for handling the seat. The backboard is pivotally mounted to a rigid seat board.

Strand discloses another example of a seat structure in which the back and seat are both rigid, and are pivotally connected to each other. The back has a slot apparently for ease of handling.

The Kailenta and Otto patents are examples of seat structures in which the back and seat are pivotally connected to each other. Both are intended to be mounted to car seats.

The Day patent describes an insert intended for use with a chair to maintain a physically handicapped person in a seated position. The insert can be used separately apart from the chair as a stretcher or a litter.

Husnik discloses another child seat that is temporarily mounted to the seat of a car.

Hayton discloses one example of a stretcher that can be reconfigured as a wheel chair. Stretchers also exist that allow the position of the patient to be adjusted to different semi-seated positions.

3. Solution to the Problem

None of the prior art references uncovered in the search show a vehicle seat liner or insert having the structure of the present invention that facilitates rapid extrication of an injured driver from the vehicle while stabilizing the driver's head and spinal cord.

SUMMARY OF THE INVENTION

This invention provides a method and apparatus for manual extrication of an injured driver from the vehicle seat. A seat liner is formed of two rigid board elements disposed against those portions of said vehicle seat normally contacted by the back and buttocks of the operator when seated. The board elements are pivotally joined to each other adjacent the juncture of the aforesaid portions of the vehicle seat. This permits the driver to sit on the liner when in the seated position in the vehicle seat and to lie upon the liner when the board elements are pivoted relative to each other to form a substantially planar configuration. The liner also has handles, hand grips, straps, or the like, that can be grasped by rescue personnel reaching into the interior of the vehicle to extricate the driver. This permits rescuers to lift the liner and the driver from the vehicle seat and out of the vehicle while stabilizing the head and back of the driver.

A primary object of the present invention is to provide a method and apparatus for manually extricating and transporting an injured driver from the vehicle while maintaining stabilization of the head and spinal cord of the driver.

Another object of the present invention is to provide a seat liner with increased support, comfort, and stability for the driver without sacrificing the feel of the car through the liner and seat.

These and other advantages, features, and objects of the present invention will be more readily understood in view of the following detailed description and the drawings.

BRIEF DESCRIPTION OF THE DRAWINGS

The present invention can be more readily understood in conjunction with the accompanying drawings, in which.

DETAILED DESCRIPTION OF THE INVENTION

Figure 1:
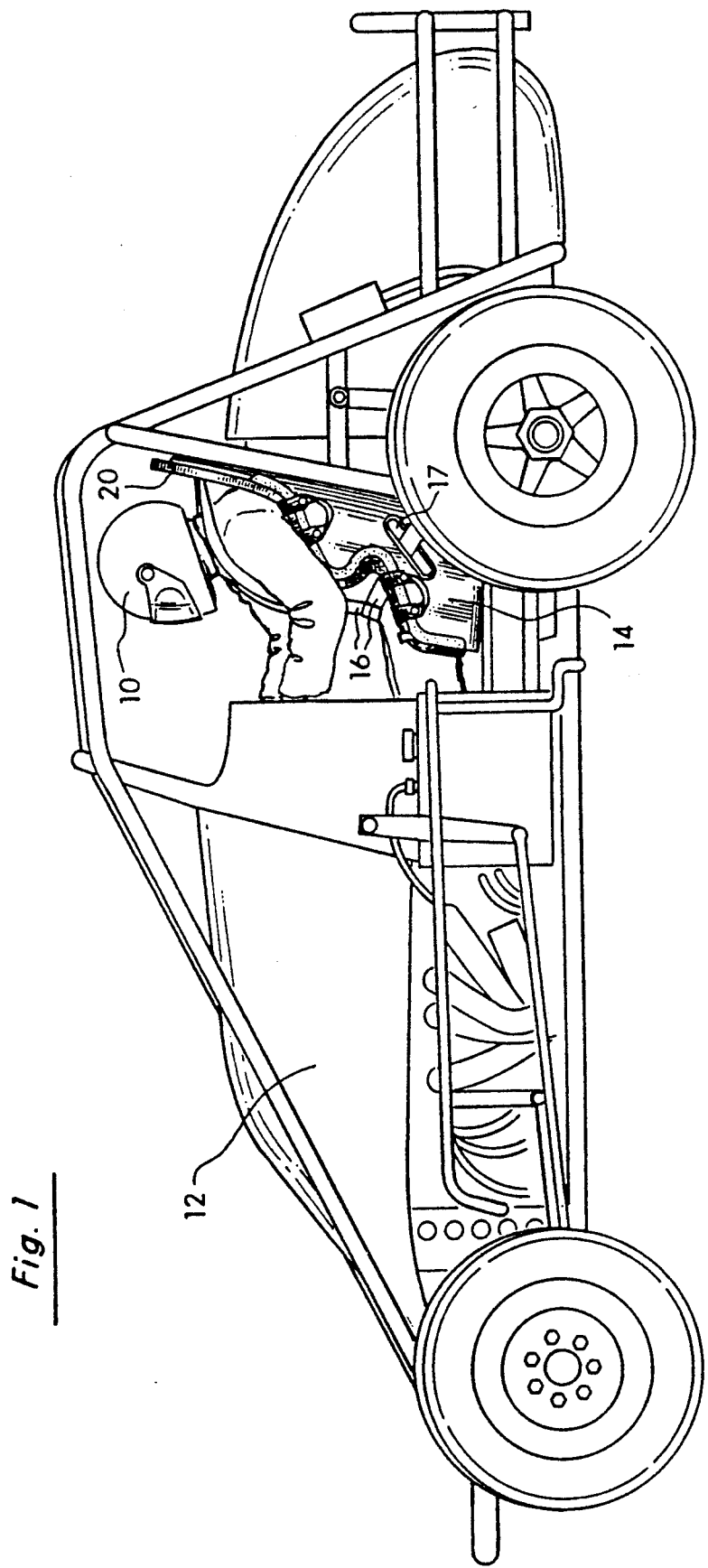
FIG. 1 is a side view showing the liner installed on the seat of a racing car.

Turning to FIG. 1., a side view is shown of a typical racing car 12 with a driver 10 seated in a conventional racing car seat 14. The driver 10 is strapped in place in the seat 14 with a restraint harness 16 anchored to the frame of the vehicle 12. The shoulder straps of the harness 16 pass through an opening in the back panel of the seat 14 and have their lower ends secured to the seat belt portion of the harness which passes over the driver's lap and through openings 17 in the side panels of the seat 14. The present invention is a seat liner 20. This liner 20 is fitted as a seat cover on top of the vehicle seat 14 and is positioned between the driver 10 and the vehicle seat 14 in normal use.

Figure 2:
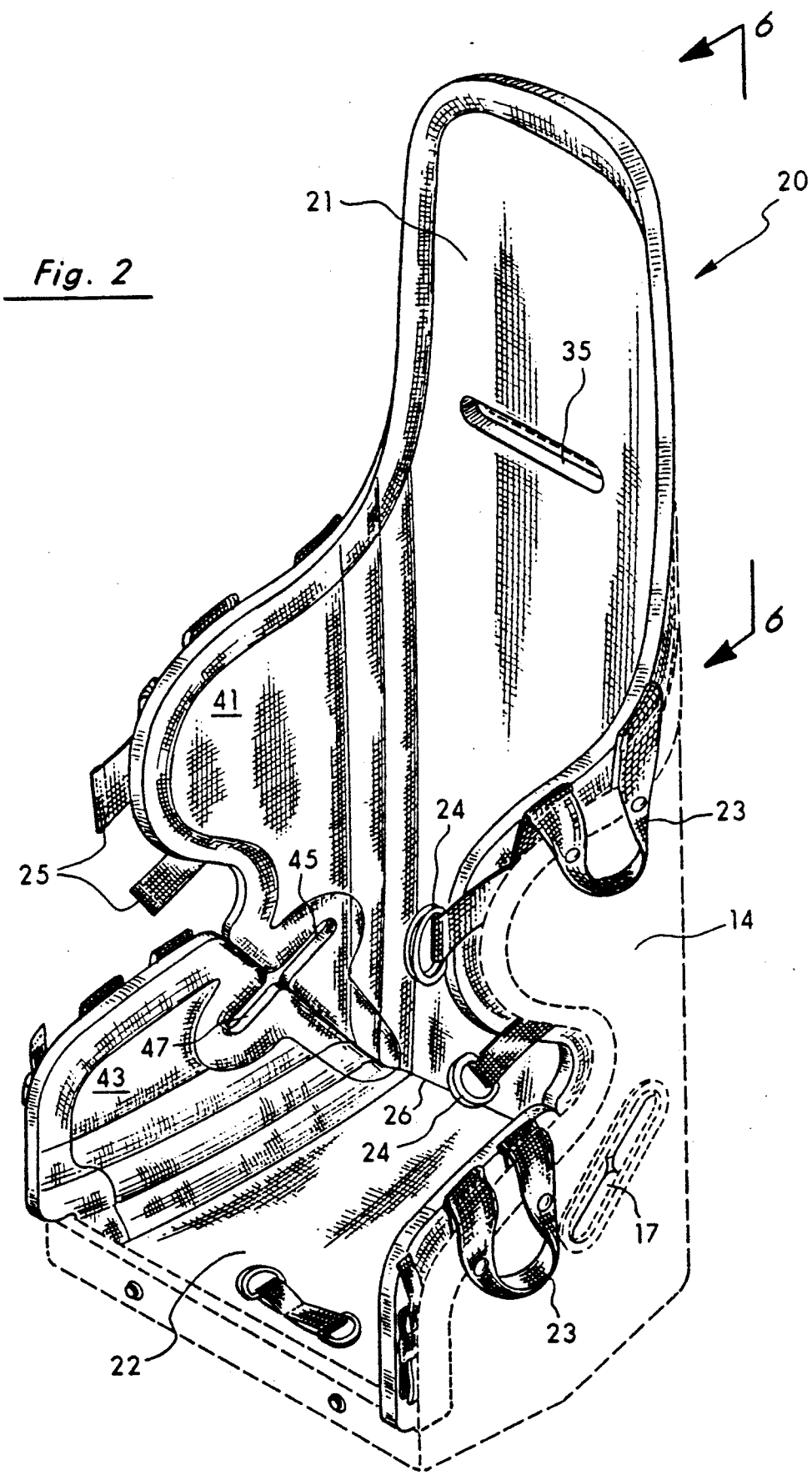
FIG. 2 is a perspective view showing the seat and liner apart from the remainder of the vehicle.
Figure 3:
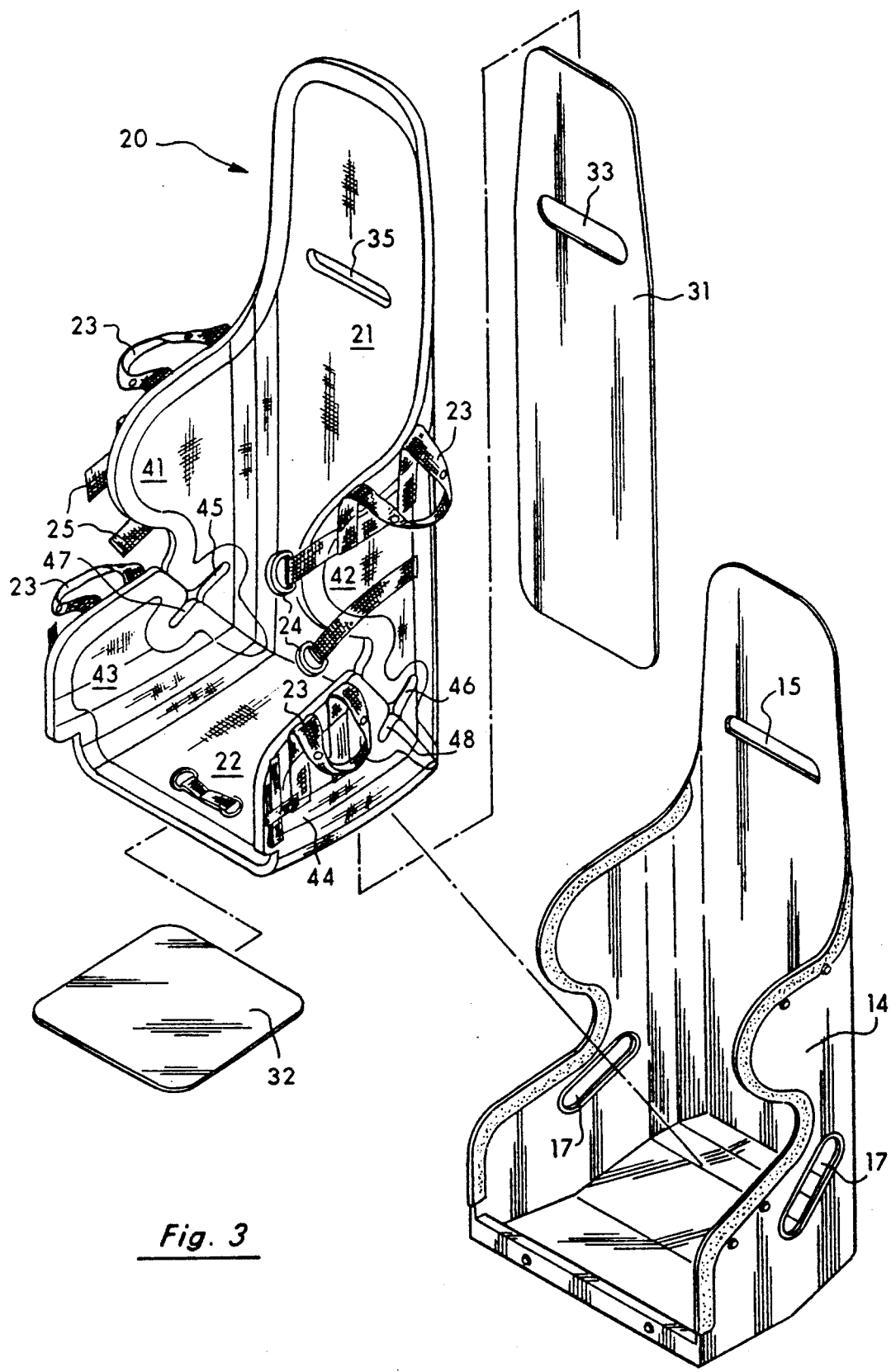
FIG. 3 is an exploded perspective view of the seat and liner corresponding to FIG. 2.

FIG. 2 is a perspective view of the liner 20 with the remainder of the vehicle seat 14 depicted in dotted lines. FIG. 3 is a corresponding exploded perspective view of the liner 20 and vehicle seat 14. A typical race car seat 14 has a back surface, a sitting surface, and two side walls. As best shown in FIG. 3, the vehicle seat 14 has openings 15 and 17 to accommodate the shoulder straps and seat belt of the harness 16 used to restrain the operator. Further detail of the liner 20 is provided in the additional views shown in FIGS. 4 through 7.

Figure 4:
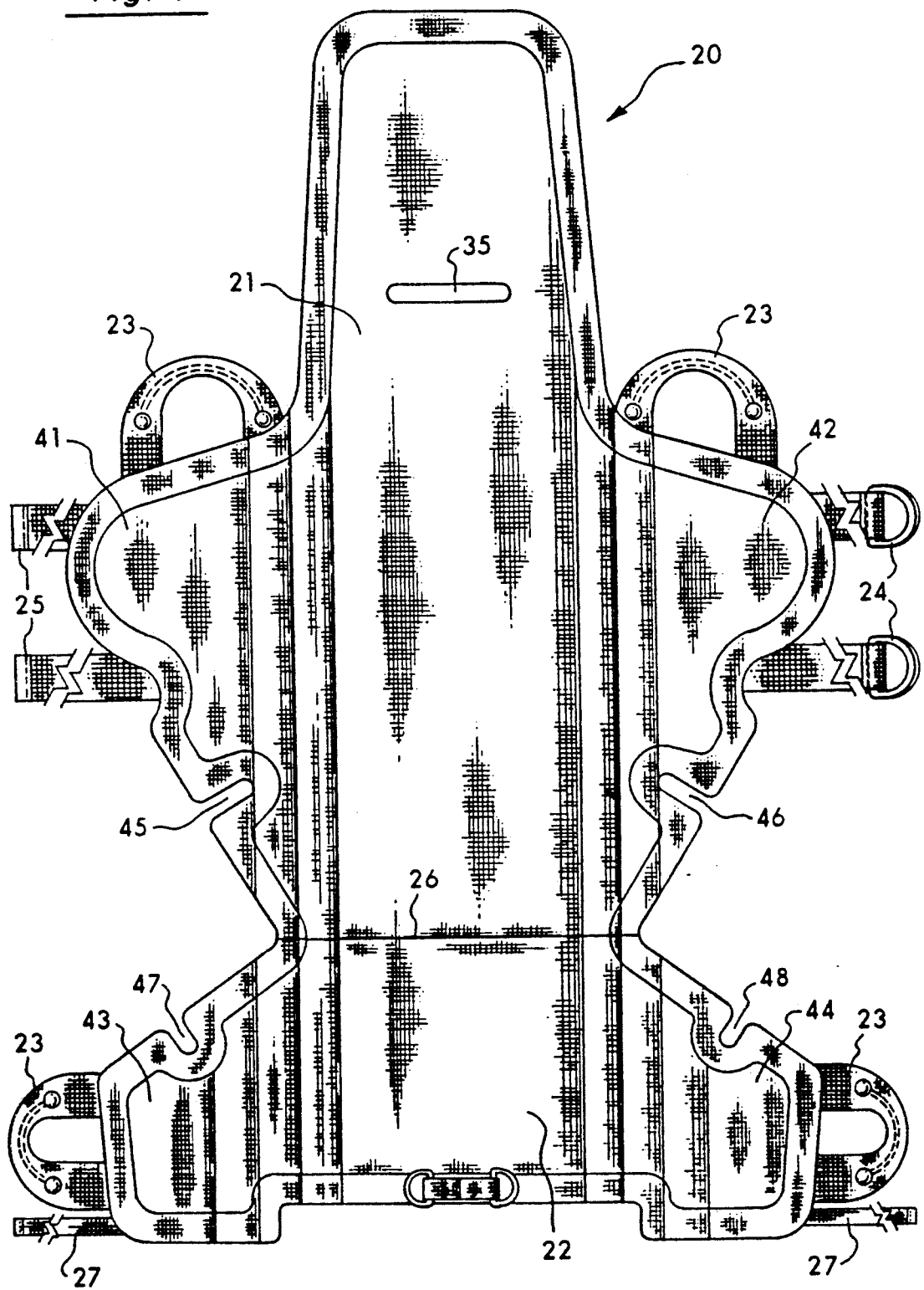
FIG. 4 is a front view of the liner with its back and seat portions pivoted to a flat position.

The liner 20 has a substantially rigid back member 21 adjacent to the back surface of the vehicle seat 14, and a substantially rigid seat member 22 adjacent to the sitting surface of said vehicle seat 14. The lower edge 26 of the back member 21 is pivotally attached to the rear edge of the seat member 22. This enables the back member 21 and the seat member 22 to be moved between angled relationships to enable the operator to sit on the liner 20 when in the seated position in the vehicle seat 14 and to lie upon the liner 20 when the back member 21 and the seat member 22 are pivoted relative to each other to form a substantially planar arrangement as shown in FIGS. 4 and 5.

In the preferred embodiment, the back member 21 has two opposing side portions 41 and 42 extending forward along the corresponding contours of the side walls of the vehicle seat 14. As shown in FIGS. 2 and 3, the side portions have handles, hand grips or straps 23 that can be gripped by a rescue personnel outside the vehicle 12 to lift and transport the liner 20 and operator 10 from the vehicle 12. The side portions also carry straps 24 and 25 that can be fastened together for removably securing an injured operator between the side portions 41, 42 and the back member 21 to help immobilize the operator's spine during transport. A formed opening 35 extends through the back member 21 in alignment with the opening 15 in the seat back to allow the shoulder straps of the restraining harness 16 to pass through the liner 20 and seat 14 and be anchored to the frame of the vehicle 12.

The seat member 22 has two opposing side portions 43 and 44 that extend upward from the lateral edges of the seat member 22 when the liner 20 is installed in the vehicle seat 14. These side portions 43 and 44 have handles, hand grips or straps 23 that can be gripped by rescue personnel, similar to the hand grips associated with the side portions 41, 42 of the back member 21. The side portions also have straps 27 that can be employed to stabilize the upper portions of the driver's legs during extrication of the driver.

Figure 5:
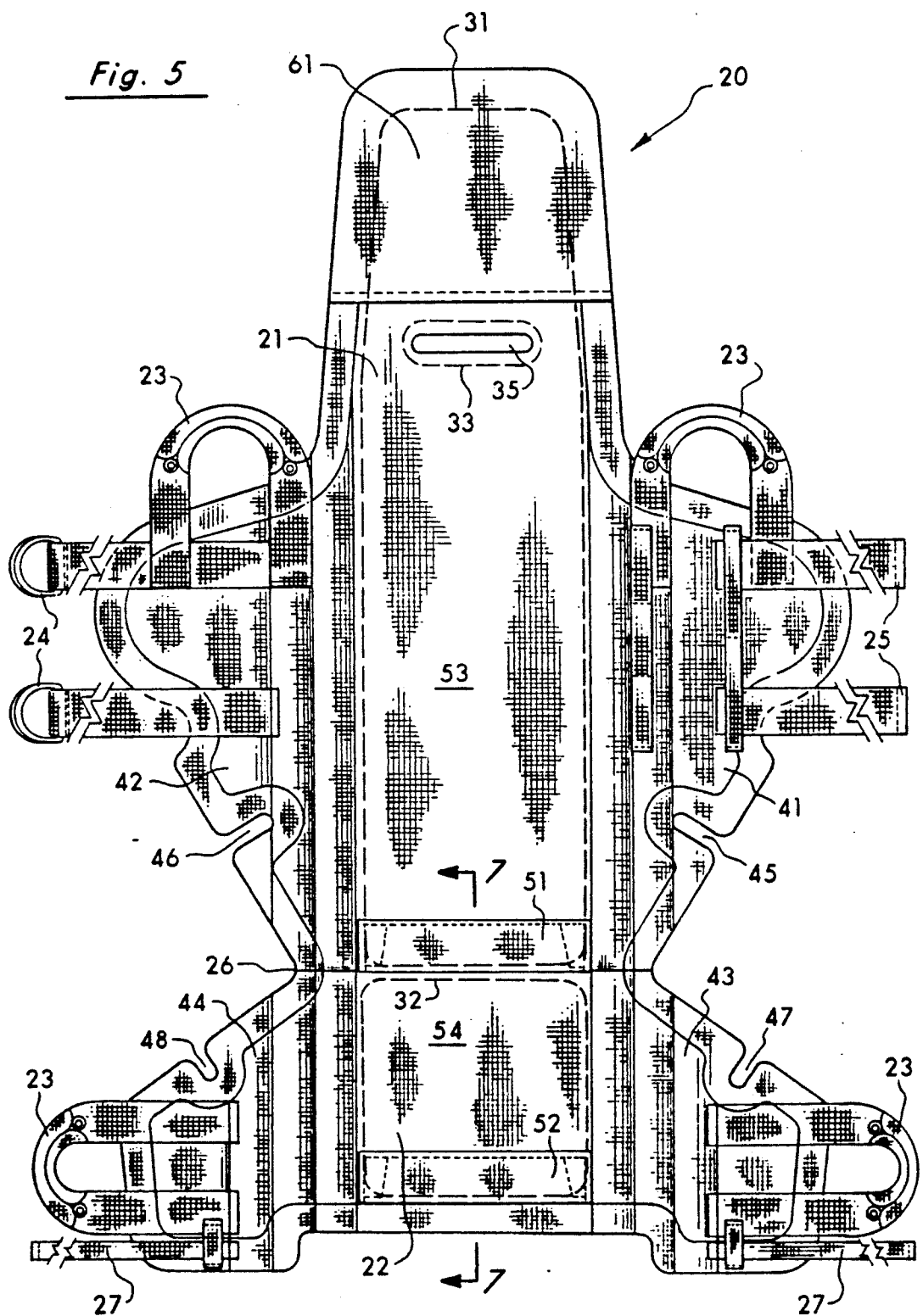
FIG. 5 is a rear view of the liner corresponding to FIG. 4.
Figure 7:
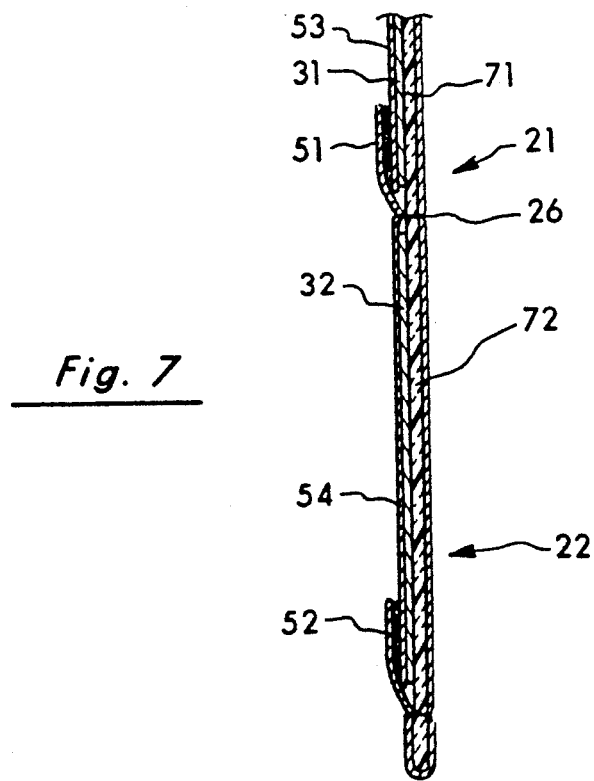
FIG. 7 is a cross-sectional view of a portion of the liner as indicated in FIG. 5.

The details of construction of the back member 21 and the seat member 22 are depicted in the exploded view of FIG. 3, the rear view of FIG. 5, and the cross-sectional view of FIG. 7. In the preferred embodiment, the rigidity of the back member 21 results from a board 31 (e.g. an aluminum panel) held inside an sleeve 53 of fire-resistant fabric. One or more additional layers of resilient material 71 can be included for padding in front of the board 31 in the sleeve 53. The board 31 can be removed from the fabric sleeve 53 through an opening along the one edge of the back member 21 which is normally covered by a flap 51. Similarly, the seat member contains a board 32 housed inside a sleeve 54 of fire-resistant fabric. A layer of padding 72 can be included in front of the board 32 in the sleeve 54 for increased driver comfort. Here again, the board 32 can be removed by opening a flap 52 extending along one edge of the seat member 22.

Figure 6:
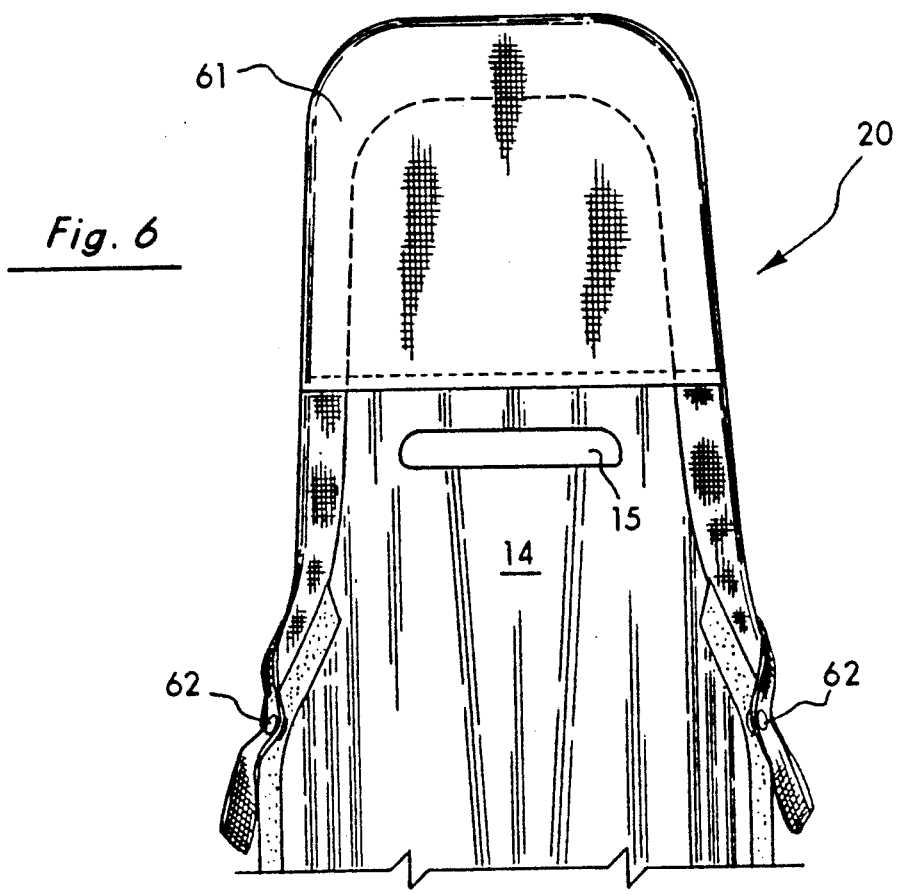
FIG. 6 is a rear view of the upper portion of the vehicle seat and liner.

During normal use of the liner 20, the upper portion of the back member 21 is removably secured to vehicle seat 14 by means of a pocket 61 that slips over the top of the vehicle seat 14 as shown in FIG. 6. A number of snaps 62 hold the liner in place with respect to the vehicle seat 14. In the event of an accident requiring extrication of the driver, the liner can be quickly and easily detached from the seat 14 by manually releasing the snaps 62 and sliding the liner 20 vertically upward over the top of the seat back so that the seat back is released from the pocket 61.

The lower edges of side portions 41, 42 of the back member 21 and the rear edges of the side portions 43, 44 of the seat member 22 abut one another when the liner 20 is positioned in the vehicle seat 14, as shown in FIG. 3. Each of these abutting edges include a concave recess 45, 46, 47, and 48. When the liner is in its inclined position as shown in FIGS. 2 and 3, these concave recesses 45 and 47, and 46 and 48 combine to form openings suitable to conveniently receive the seat belt of the restraint harness 16.

Figure 8:
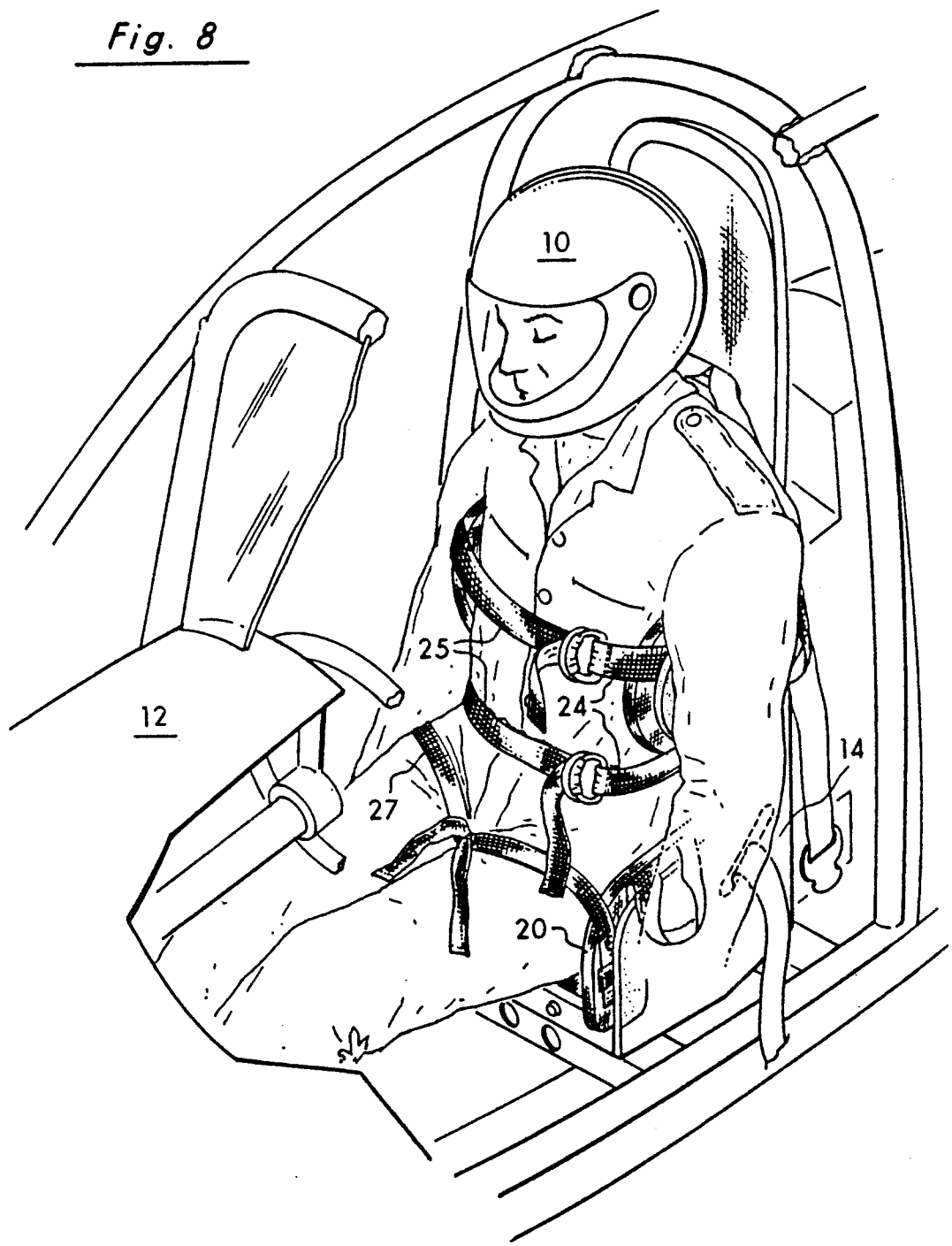
FIG. 8 is a perspective view of an injured driver sitting on the liner in a vehicle seat after the straps have been fastened around the driver by rescue personnel prior to extrication of the driver from the vehicle.
Figure 9:
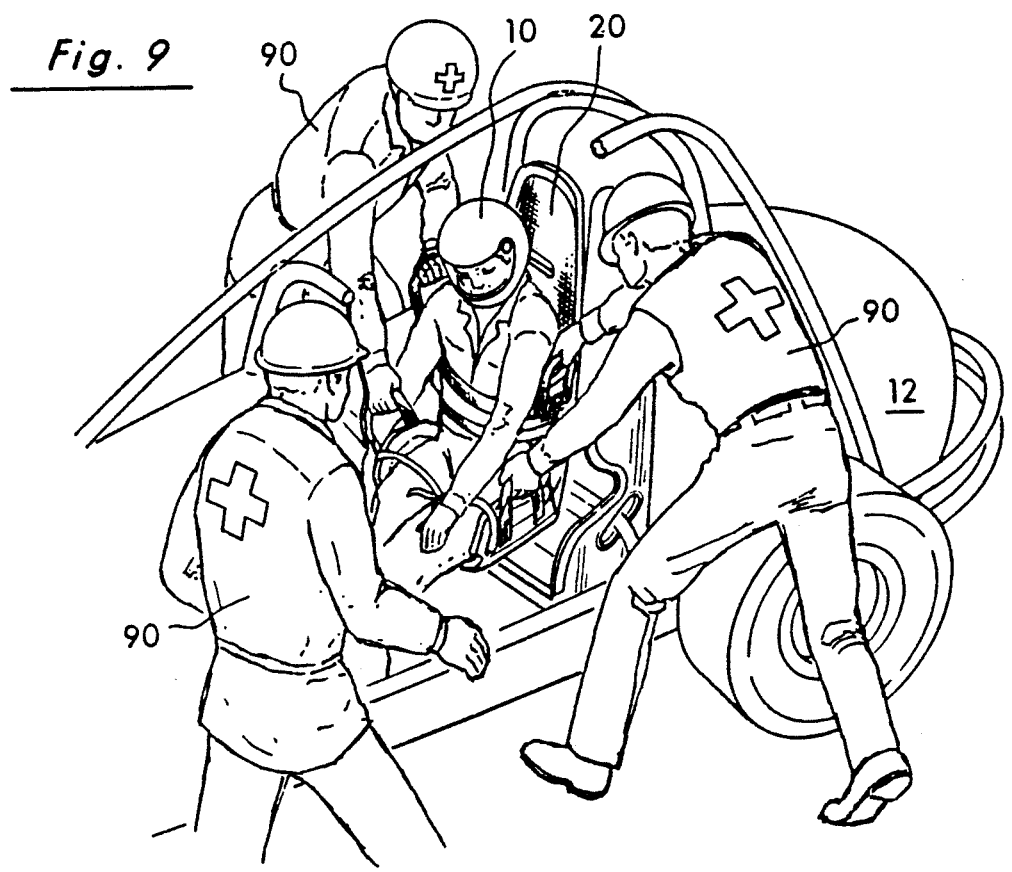
FIG. 9 is a perspective view of rescue personnel lifting the liner and the injured driver out of the vehicle seat.
Figure 10:
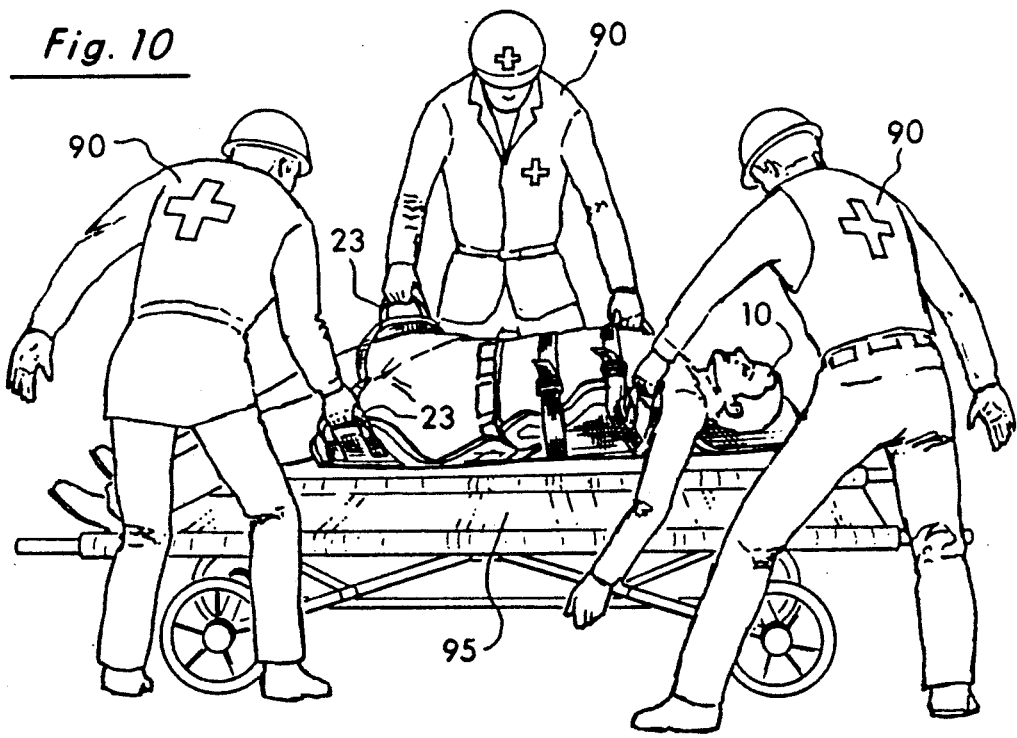
FIG. 10 is a perspective view of the injured driver being lowered with the liner onto a stretcher in a reclined position.

FIGS. 8 through 10 demonstrate the typical method used to extricate an injured driver 10 using the liner 20. The liner 20 is placed on the vehicle seat 14 before the driver enters the vehicle 12. At this point, the back member 21 of the liner 20 is disposed against the seat back with the shoulder straps of the restraint harness 16 extending through the aligned openings 15 and 35 in the seat back and liner, respectively. The seat member 22 of the liner 20 is disposed against the lower portion of the vehicle seat 14. The driver then enters the vehicle and is seated on the liner such that the driver's back contacts the back member 21 of the liner 20 and the driver's buttocks contact seat member 22 of the liner 20. The restraint harness 16 is fastened about the driver 10 with the seat belt passing through the openings 17 in the vehicle seat and the openings defined by the abutting edges 45 and 47, 46 and 48 of the side portions of the liner. As previously discussed, the back member 21 and the seat member 22 of the liner 20 are pivotally joined to each other substantially adjacent the juncture of the aforesaid portions of the vehicle seat. Under normal driving conditions, the driver 10 is in a seated position on the liner 20 with the angle between the back member and seat member being fixed by the vehicle seat 14. In the event the vehicle is subsequently involved in an incapacitating accident, rescue personnel 90 rush to assist the driver 10. The rescuers 90 manually release the restraint harness 16 and secure the driver 10 to the liner 20 by fastening the straps 24, 25 and 27 around the chest and upper legs of the driver as depicted in FIG. 8. The rescue personnel reach into the vehicle and grasp the handles 23 to lift the liner 20 and driver 10 out of the vehicle seat 14. The driver 10 is carried on the liner 20 from the vehicle 12 to a site where appropriate medical care can be administered. It should be noted that the rigidity of the back member 21 and the seat member 22 serve to help stabilize the driver's head and spine during extrication and transportation. The angle between the back member 21 and the seat member 22 can be controlled by the rescue personnel depending upon the nature of the injuries suffered by the driver 10. In many instances, it is desirable to place the injured driver 10 in a reclined position on a stretcher 95 as shown in FIG. 10. The back member 21 and the seat member 22 of the liner can be readily pivoted relative to each other to form a substantially planar arrangement by rescue personal 90 grasping the handles 23. After the injured driver has been placed on the stretcher, the straps 24, 25, and 27 are unfastened and the side portions 41, 42, 43, and 44 of the liner 20 can be folded down into a substantially flat position so as not to interfere with medical treatment of the driver 10. Alternatively, the driver 10 can be extricated and transported without substantial change in the angular relationship between the back member 21 and the seat member 22 of the liner 20.

The above disclosure sets forth a number of embodiments of the present invention. Other arrangements or embodiments, not precisely set forth, could be practiced under the teachings of the present invention and as set forth in the following claims.

We claim:

1. A method of manually extricating a shoulder harness wearing operator of a vehicle from the operator's vehicle seat in the event of circumstances requiring stabilization of the head and spinal cord of said operator, comprising the steps of:

disposing substantially rigid board elements against those portions of said vehicle seat normally contacted by the back and buttocks of the operator when seated, the rigid back member including a defined opening to accommodate a shoulder harness for the operator, the board elements being pivotally joined to each other substantially adjacent the juncture of the aforesaid portions of the vehicle seat, the board elements being movable between angled relationships to enable the operator to sit on said board elements when in the seated position in the vehicle seat and to lie upon the board elements when the board elements are pivoted relative to each other to form a substantially planar arrangement of said board elements;

providing structure in association with at least one of the board elements capable of being grasped by individuals reaching into the interior of the vehicle to extricate said operator; and grasping the board elements in the event of circumstances requiring stabilization of the head and spinal cord of said operator and lifting the board elements and said operator from the vehicle seat and out of the vehicle while maintaining stabilization of the head and spinal cord of the operator.

2. The method of claim 1 further comprising the step of strapping said operator to said broad elements prior to lifting said operator from said vehicle seat.

3. The method of claim 1 wherein said board elements are component parts of a seat liner.

4. In combination apparatus mountable to the seat of a vehicle for facilitating extraction of a shoulder harness wearing operator of the vehicle from the vehicle in the event of circumstances requiring stabilization of the head and spinal cord of the operator and for transporting the operator to a site where medical attention can be rendered to the operator, the extrication and transportation of the operator being accomplished without separating the operator from contact with the apparatus, comprising rigid board elements disposed against those portions of the vehicle seat normally contacted by the back and buttocks of the operator when seated, the rigid back member including a defined opening to accommodate a shoulder harness for the operator, the board elements being pivotally joined to each other substantially adjacent the juncture of the aforesaid portion of the vehicle seat, the board elements being movable relative to each other to enable the operator to sit against said board elements when in the seated position in the operator's vehicle seat and to lie upon the board elements when the board elements are pivoted relative to each other to form a substantially flat conformation, the apparatus further comprising means formed on the apparatus for facilitating grasping of said apparatus by rescue personnel reaching into the interior of the vehicle in an attempt to extricate the operator and apparatus from the vehicle, the apparatus being convertible to an arrangement for transporting the operator on extrication from the vehicle by pivoting the board elements relative to each other.

5. The apparatus of claim 4 wherein at least one of said board elements is removable from said apparatus.

6. A vehicle seat liner for use in extricating a shoulder harness wearing injured operator from a seat having a back surface and a sitting surface, said liner comprising:

a substantially rigid back member adjacent to said back surface of said vehicle seat having a lower edge, and two opposing side portions extending forward from said back member the rigid board element that contacts the back of the operator including a defined opening to accommodate a shoulder harness for the operator;

a substantially rigid seat member adjacent to said sitting surface of said vehicle seat, said seat member having a rear edge pivotally attached to said lower edge of said back member;

hand grip means associated with at least one of said side portions of said back member; and strap means associated with said side portions for removably securing said injured operator said side portions and said back member whereby said back member and said seat member can be pivotally adjusted between a seated position in which said liner fits into said vehicle seat, and a reclined position in which said back member and said seat member are in a substantially planar relationship.

7. The liner of claim 6 wherein said back member comprises a substantially rigid board member having a resilient covering.

8. The liner of claim 6 wherein said seat member comprises a substantially rigid board member having a resilient covering.

9. The liner of claim 6 wherein said seat member further comprises two opposing side portions extending substantially upward from said seat member, with hand grip means associated with at least one of said side portions.

* * * * *